3,093,776
Patented June 11, 1963

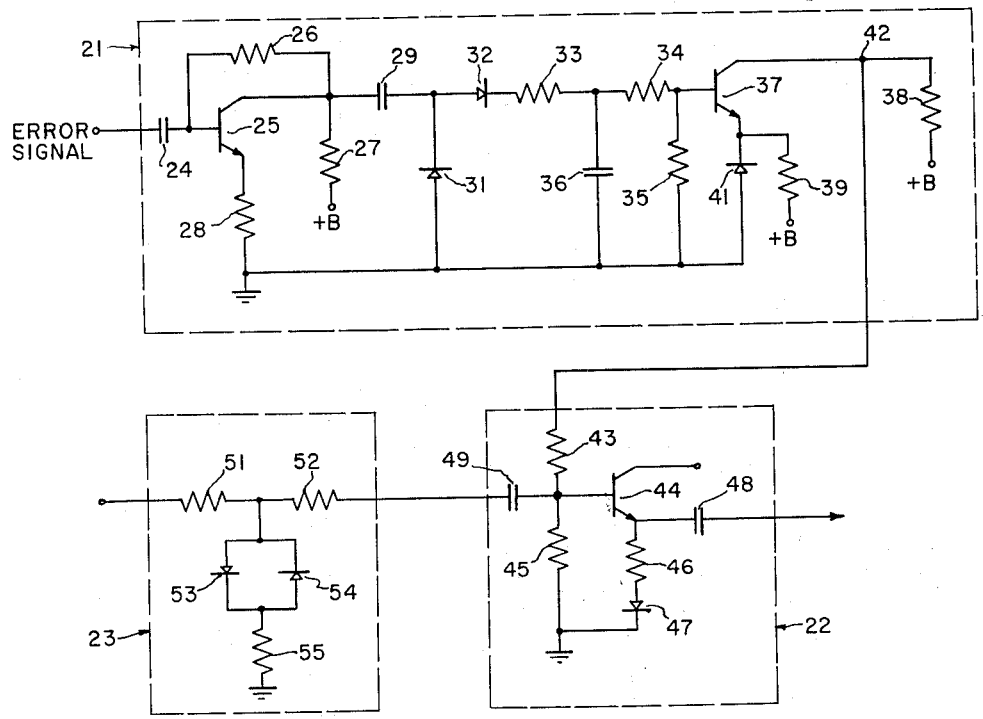
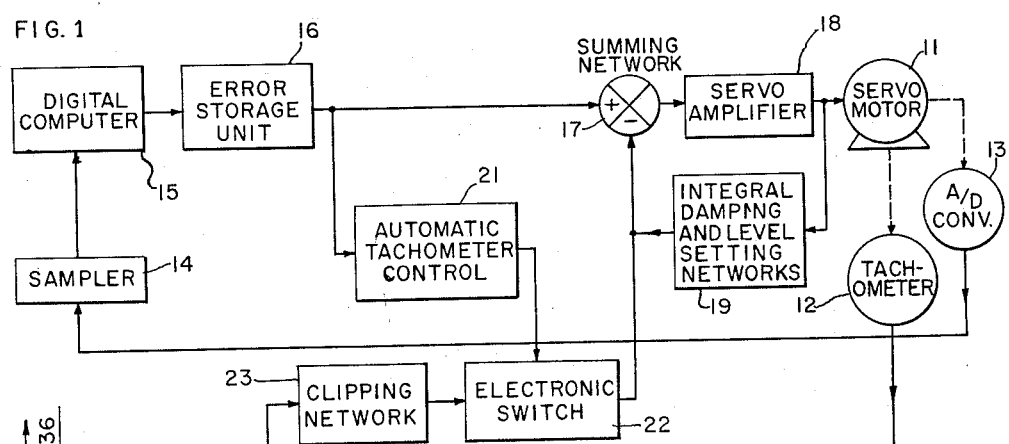
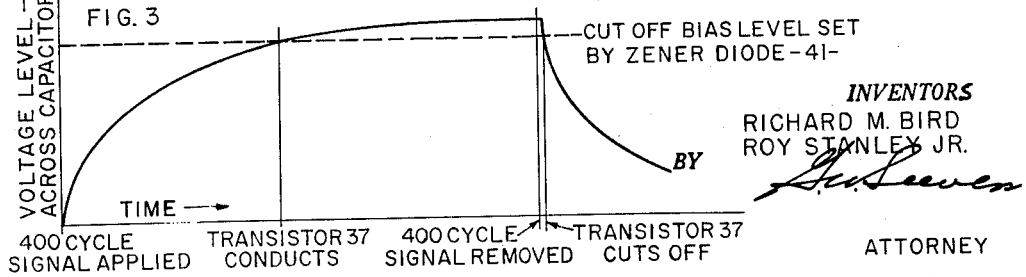

3,093,776
DIGITAL SERVO LOOP WITH AUTOMATIC TACHOMETER CONTROL TO PROVIDE VARIABLE DAMPING
Richard M. Bird, Glendale, and Roy Stanley, Jr., Los Angeles, Calif., assignors to General Precision, Inc., a corporation of Delaware
Filed Jan. 3, 1961, Ser. No. 80,141
9 Claims. (Cl. 318—28)

This invention relates to digital servo loops and more particularly to a digital servo loop with automatic tachometer control to provide variable damping.

Certain digital servo loops provide an error signal from the digital computer to the servo motor which is proportional to the magnitude of the error to provide for high slewing speeds with a large error and relatively high damping or slow speed near the null point. However, these systems are relatively complex and expensive to build. Another conventional digital servo loop utilizes a tachometer feedback for damping the error signal which appears as a positive pulse, a negative pulse of similar amplitude, or no signal. This error signal is non-linear and is not proportional to the amount of the error.

In systems of this type with sufficient feedback to provide high damping near the null point it is not possible to obtain high slewing speed for larger errors, and, when the feedback is attenuated to provide higher slewing speeds, then the system is not stable near the null point and may be too sensitive to noise and other spurious signals.

Briefly stated, one preferred embodiment of the present invention consists essentially of a digital servo loop with tachometer feedback from the servo motor to a summing network which combines the feedback and error signals as an input to the servo amplifier. This system is modified by the provision of a transistorized automatic tachometer control circuit which integrates the successive error signals and actuates a switching transistor to vary the tachometer feedback. This provides full feedback and high damping near the null point, and attenuated feedback with high slewing speeds for larger errors which are indicated by an error signal which persists for a certain length of time.

One object of the present invention is to provide an automatic tachometer control for compensation with a nonlinear digital computer control loop.

Another object of the present invention is to provide a digital servo loop with automatic tachometer control to provide for stability when there is no access to the true error signal or an error signal which is proportional to the magnitude of the error.

A further object of the present invention is to provide a digital servo loop with automatic tachometer control to provide variable damping for two levels of tachometer feedback, one of which provides for full tachometer feedback to produce a well damped loop insensitive to external or internal noises and load disturbances, and a second level providing approximately ten to one attenuation of the tachometer feedback, which allows the motor to slew at a relatively high rate.

Other objects and many of the attendant advantages of this invention will be readily appreciated as the same becomes better understood by reference to the following detailed description when considered in connection with the accompanying drawings wherein;

FIG. 1 is a block diagram illustrating one preferred embodiment of the present invention;

FIG. 2 is a schematic diagram illustrating one preferred form of transistorized circuitry for the clipping network, electronic switch and automatic tachometer control of FIG. 1; and FIG. 3 is a waveform diagram illustrating the action of the automatic control circuit of FIG. 1.

Referring now to the drawings in detail and more particularly to the block diagram of FIG. 1, a digital servo system is illustrated in which the servo motor 11 is mechanically connected to a tachometer 12 and an analog to digital converter 13 which converts the shaft position of the servo motor into a suitable binary digital number.

The binary digital number from the analog to digital converter 13 passes through the sampler 14 which may be a part of the digital computer 15 and samples the information from the analog to digital converter 13 at a suitable sampling rate such as 157 cycles per second.

In normal useage the digital computer 15 may be connected to a number of other similar servo loops through the sampler 14.

In the digital computer 15 information, such as horizontal range from an external source, is compared with the information from the analog to digital converter 13, and through comparison an error signal is developed which may appear as a positive pulse, a negative pulse of similar amplitude, or no signal. The error signal is passed to the error storage unit 16 which stores the error signal from the computer 15, and where the error signal is phase modulated at a particular frequency such as 400 cycles per second and coupled through a summing network 17 to the servo amplifier 18.

The servo amplifier 18 is preferably provided with an integral damping and level setting networks 19 which feeds back an attenuated signal to the summing network 17 to provide a damping action during periods when the signal from the servo amplifier changes rapidly over a short period of time.

The error signal from the error storage unit 16 is also supplied to an automatic tachometer control circuit 21 which is connected to an electronic switch 22 receiving the tachometer signal from the clipping network 23 for regulation of the amount of tachometer feedback from the tachometer 12 to the summing network 17.

Referring now to the detailed circuit diagram of FIG. 2, the error signal from the error storage unit 16 is applied through a condenser 24 to an A.C. amplifier consisting of the transistor 25 together with its bias resistor 26, load resistor 27 and emitter stabilizing resistor 28 which is connected through the A.C. coupling capacitor 29 to a rectifying network consisting of the diodes 31 and 32 and through an A.C. filter and D.C. integrating network consisting of the resistors 33, 34 and 35 and capacitor 36.

The D.C. voltage level is applied to a level detector consisting of the transistor 37 together with its load resistor 38 and a current limiting resistor 39 and a Zener bias reference diode 41.

The voltage at junction 42 between the collector of transistor 37 and load resistor 38 is connected through a resistance 43 to the base of switching transistor 44 and through a resistor 45 connected to ground. The emitter of transistor 44 is connected through a resistance 46 and a diode 47 to ground.

The emitter of transistor 44 is also connected through an A.C. coupling capacitor 48 to the summing network 17. The base of transistor 44 is connected through a coupling capacitor 49 to the clipping network 23 consisting of resistances 51 and 52 connected through diodes 53 and 54 and resistance 55 to ground as shown.

The digital servo system of the present invention with automatic tachometer control may be utilized with many nonlinear digital computer control loops to provide for stability when there is no access to a true error signal which is proportional to the magnitude of the error. Essentially this system provides two levels of tachometer feedback. The first level provides for full tachometer feedback which produces a well damped loop insensitive to external and internal noises and load disturbances. The second level provides for high attenuation of the tachometer feedback which allows the motor to slew at a relatively high rate. The action of the automatic tachometer control circuit 21 is thus to provide a two speed type of loop.

In one particular application of the present invention the digital servo loop with automatic tachometer control to provide variable damping may be utilized in any one or all of the servo loops in a fire control system, such as the horizontal range loop.

Horizontal range information would be supplied to the digital computer 15 from an analyzer input section of the system (not shown). This information is compared in the digital computer 15 with information from the analog to digital converter 13 through the sampler 14.

The digital computer 15 compares the data at some particular sampling rate such as 157 cycles per second and through comparison an error signal is developed and passes to a binary weighting network which preferably forms a part of the digital computer 15. The binary weighting network converts the computer logic signals to a pair of complementary analog voltage levels, which are limited to phase alone at a constant amplitude or no signal. That is, the output signal appears as a positive pulse, a negative pulse of similar amplitude, or no signal. The output of the binary weighting network is passed to the error storage unit 16 which stores the error signal from the binary weighting network at a specified time reference address in the computer cycle. The error signal is phase modulated at 400 cycles per second and coupled through the summing or integrating network 17 back into the horizontal range loop as a feedback error signal through the servo amplifier 18 to the servo motor 11.

The horizontal range loop is characterized by two subordinate loops, illustrated in FIG. 1. The first subordinate loop consists of the high gain servo amplifier 18 together with the integral damping network and attenuation or level setting network 19. The second subordinate loop consists of the servo amplifier 18, servo motor 11, tachometer 12, the limiter or clipping network 23 and another level setting network consisting of the automatic tachometer control 21 and electronic switch 22 which provides a feedback damping signal to the summing network 17 which will be of opposite phase to the error signal from the error storage unit 16.

The desired requirements of a particular servo system such as the horizontal range loop are of a conflicting nature as follows:

(1) One requirement demands that the system be able to mechanically position accurately to one part in 50,000 (4 yards in 200,000 yards).

(2) The other requirement demands that the system be able to slew at a relatively high rate of 80,000 yards per minute.

The problem lies in the fact that when the system gain is adjusted for slewing at the desired high rate, it becomes extremely sensitive to noise and load disturbances and this causes chatter with zero input signal applied. This conflict is alleviated by addition of the integral damping network 19 and tachometer feedback with automatic tachometer control.

The integral damping and the tachometer feedback networks are conventional types of compensating networks, however, the automatic tachometer control network of the present invention is unique.

The digital computer 15 provides no information regarding the size of the error signal, but merely indicates whether the error is positive, negative or a zero null. The automatic tachometer control circuit 21 utilizes this information and in accordance therewith regulates the amount of tachometer feedback through electronic switch 22. Functionally, the action of the automatic tachometer control circuit is as follows:

A. For a null condition the automatic tachometer control circuit 21 adjusts electronic switch 22 for maximum tachometer feedback and the system is insensitive to noise.

B. For small errors maximum tachometer feedback is still applied and the system reacts normally as a well damped system. This is accomplished through the use of a short integration of error signals such that the system must remain off null in a given direction for a prescribed period before tachometer feedback is removed, initiating large error conditions of operation. For example, as the system traverses the null condition in several overshoots no large signal operation follows, due to the short period in which the system remains in single phase error.

C. For larger errors, when either a positive or negative error signal persists for a certain period of time minimum tachometer feedback is applied allowing the system to slew at the desired high rate. When the error signal changes polarity maximum tachometer feedback is again applied which allows the system to return to a null condition with a minimum number of overshoots.

Referring now specifically to the detailed operation of the automatic tachometer control circuit 21 and the electronic switch 22 as illustrated in FIG. 2, the error signal from the error storage unit 16 is an A.C. signal such as a 400 cycle signal which is applied through the coupling capacitor 24 to the A.C. amplifier including transistor 25.

The amplified signal is coupled through capacitor 29, through the A.C. filter and D.C. integrating network to the level detector and D.C. switch including transistor 37 and the Zener bias reference diode 41. The action of this circuit is as follows:

(1) With no error signal applied to this circuit the Zener diode 41 biases the transistor 37 to cutoff and the B+ voltage appears at the terminal or junction point 42 and then goes to the biasing circuit across resistance 43 to the base of the switching transistor 44 in the tachometer feedback loop. This bias voltage maintains the gain of the switching transistor 44 at unity to provide a maximum tachometer feedback under these conditions.

(2) With a voltage such as 0.2 volt peak to peak, the 400 cycle error signal applied to transistor 25 is amplified and the diodes 31 and 32 rectify the signal, with either a positive or negative error signal.

(3) The accumulation of charge on the capacitor 36 is the key to the operation of the circuit. The RC time constant set by the resistances 33 and 34 and capacitor 36 and the input impedance of transistor 37 determines the time required for the voltage input to transistor 37 to reach a level which will be greater than the cutoff bias level set by the Zener diode 41. At the time this level is reached, after the error signals persist for a certain period of time transistor 37 begins to conduct. The voltage input level will increase until transistor 37 is conducting heavily dropping the voltage at junction 42 to a much lower voltage such as 5 volts.

This lower voltage at terminal 42 is supplied across the resistor 43 to the bias circuit or base of transistor 44 and changes its gain from unity to an attenuation of approximately 10 to 1, thus substantially reducing the amount of tachometer feedback to the summing network 17.

(4) If the 400 cycle input signal is removed, the voltage across condenser 36 will reduce rapidly during a very short period of time and almost instantly the voltage will fall below the cutoff voltage level set by Zener diode 41 and thus transistor 37 is again cutoff and the voltage at the junction point 42 will rise to 32.5 volts, thus providing full tachometer feedback again.

The action of the automatic tachometer control circuit 21 is clearly illustrated in the wave form diagram of FIG. 3.

The switching transistor 44 with its associated circuitry constituting the electronic switch 22 should be placed near the input network or summing network 17 to the servo amplifier, so that it will not react to any stray pickup. The integrating network or automatic tachometer control 21 need not necessarily be placed near the summing network 17.

Obviously, many other modifications and variations of the present invention may be made within the scope of the following claims.

What is claimed is:

1. In a digital servo loop having a servo motor and tachometer feedback with a summing network and servo amplifier receiving error and feedback signals to control the servo motor, the improvement comprising a switch receiving said tachometer feedback and applying a variable feedback signal to said summing network, and an automatic tachometer control circuit receiving said errors signals and applying a control signal to said electronic switch for varying the amount of tachometer feedback in accordance with a time integral of successive error signals.

2. In a digital servo loop having a servo motor and tachometer feedback with a summing network and servo amplifier receiving error and feedback signals to control the servo motor, the improvement comprising an electronic switch receiving said tachometer feedback and applying a variable feedback signal to said summing network, and an automatic tachometer control circuit including rectifying and integrating networks and level detector for receiving said error signals and applying a control signal to said electronic switch for varying the amount of tachometer feedback in accordance with a time integral of successive error signals.

3. In a digital servo loop having a servo motor and tachometer feedback with a summing network and servo amplifier receiving error and feedback signals to control the servo motor, the improvement comprising an electronic switch receiving said tachometer feedback and applying a variable feedback signal to said summing network, and an automatic tachometer control circuit receiving said error signal and applying a control signal to said electronic switch for varying the amount of tachometer feedback in accordance with a time integral of successive error signals, said feedback signal being a maximum for no error and error signals of short duration and attenuated for error signals which persist for a certain period of time.

4. A digital servo loop with tachometer feedback comprising switching means adapted to receive the feedback signal, and a control circuit adapted to receive and integrate successive non-linear error signals and develop a control signal which is applied to said switching means for providing full tachometer feedback near the null point and attenuated feedback when said error signals persist.

5. A digital servo loop with tachometer feedback comprising switching means adapted to receive the feedback signal, a summing network adapted to receive error signals, and a control circuit adapted to receive and integrate successive non-linear error signals and develop a control signal which is applied to said switching means for providing full tachometer feedback to said summing network near the null point and attenuated feedback when said error signals persist.

6. A digital servo loop with tachometer feedback comprising a servo motor, a tachometer connected to said servo motor, switching means adapted to receive the feedback signal from said tachometer, a summing network, a servo amplifier connected to said summing network and servo motor, and a control circuit adapted to receive and integrate successive non-linear error signals and develop a control signal which is applied to said switching means for providing full tachometer feedback to said summing network near the null point and attenuated feedback when said error signals persist.

7. A digital servo loop comprising a servo motor, a tachometer, means to provide successive non-linear output error signals, a summing network receiving said error signals, a servo amplifier receiving the output signal from said summing network and applying a signal to said servo motor, an electronic switch receiving a feedback signal from said tachometer and providing a variable feedback signal to said summing network, and an automatic tachometer control circuit integrating said error signals and providing a control signal to said switch for attenuating said tachometer feedback signal when said error signals persist.

8. A digital servo loop comprising a servo motor, a tachometer and an analog to digital converter connected to said servo motor, a digital computer connected to said converter and adapted to be connected to an external source of information and provide successive non-linear output error signals, an error storage unit receiving said error signals, a summing network receiving said error signals fom said storage unit, a servo amplifier receiving the output signal from said summing network and applying a signal to said servo motor, a clipping network receiving a tachometer feedback signal, an electronic switch receiving said feedback signal from said clipping network and providing a variable feedback signal to said summing network, and an automatic tachometer control circuit integrating said error signals and providing a control signal to said switch for attenuating said tachometer feedback signal when said error signals persist.

9. A digital servo loop comprising a servo motor, a tachometer and an analog to digital converter connected to said servo motor, a sampler connected to said converter, a digital computer connected to said sampler and adapted to be connected to an external source of information and provide successive non-linear output error signals, an error storage unit receiving said error signals, a summing network receiving said error signals from said storage unit, a servo amplifier receiving the output signal from said summing network and applying a signal to said servo motor, an integral damping and level setting network receiving the output signal from said servo amplifier and applying a damping signal to said summing network, a clipping network receiving said tachometer feedback signal, an electronic switch receiving said feedback signal from said clipping network and providing a variable feedback signal to said summing network, and an automatic tachometer control circuit integrating said error signals and providing a control signal to said switch for attenuating said tachometer feedback signal when said error signals persist.

References Cited in the file of this patent

UNITED STATES PATENTS

| 2,913,654 | Clark | Nov. 17, 1959 |
| 2,945,995 | Weil | July 19, 1960 |
| 2,947,929 | Bower | Aug. 2, 1960 |